(12) United States Patent
Wang

(10) Patent No.: US 8,723,697 B2
(45) Date of Patent: May 13, 2014

(54) DEVICE FOR AUTOMOBILE SAFETY

(75) Inventor: Linhu Wang, Hengxi Town (CN)

(73) Assignee: Ningbo Yinzhou Yonglin Electron Electrical Equipment Co., Ltd., Ningbo (CN)

( * ) Notice: Subject to any disclaimer, the term of this patent is extended or adjusted under 35 U.S.C. 154(b) by 186 days.

(21) Appl. No.: 13/346,585

(22) Filed: Jan. 9, 2012

(65) Prior Publication Data

US 2012/0313795 A1    Dec. 13, 2012

(30) Foreign Application Priority Data

Jun. 9, 2011 (CN) .......................... 2011 1 0154664

(51) Int. Cl.
*G08G 1/123* (2006.01)

(52) U.S. Cl.
USPC .......................... 340/989; 340/988; 340/425.5

(58) Field of Classification Search
USPC ....................................................... 340/989
See application file for complete search history.

(56) References Cited

U.S. PATENT DOCUMENTS

| | | | |
|---|---|---|---|
| 6,889,135 B2* | 5/2005 | Curatolo et al. | 701/468 |
| 7,783,423 B2* | 8/2010 | Verma et al. | 701/469 |
| 2010/0201545 A1* | 8/2010 | Narea et al. | 340/936 |

FOREIGN PATENT DOCUMENTS

CN        101459015 A        6/2009

* cited by examiner

*Primary Examiner* — Travis Hunnings
(74) *Attorney, Agent, or Firm* — Cheng Law Group, PLLC

(57) ABSTRACT

The present invention discloses a device for automobile safety in the field of automobile safety, which addresses the problems existing in the prior art that the conventional automobiles tend to be stolen and have a low safety. The device for automobile safety includes an RF antenna (JP1), an RFID module, a GSM unit, a data processing unit (U1), a control unit (U2) and automobile circuits. The device for automobile safety of the invention has numerous benefits, for example an improved theft-proof property and warnings against driving at fatigue and/or beyond the speed limit.

20 Claims, 7 Drawing Sheets

DEVICE FOR AUTOMOBILE SAFETY

BACKGROUND OF THE INVENTION

1. Field of Invention

The present invention relates to a device for automobile safety in the field of automobile safety.

2. Related Art

With the rapid development of national economy of People's Republic of China, the significant improvement of national living standard and the continuous progress of science and technology, more and more people are possessing automobiles, in which case people are confronted with the problem involving protection of their automobiles from being stolen.

The conventional anti-theft devices for automobiles include mechanical anti-theft devices and electronic anti-theft devices. The mechanical anti-theft devices mainly achieve the theft-proof purpose by locking the clutch, brake, throttle or steering wheel. However, the mechanical anti-theft devices could not make alarms and are troublesome to be mounted and removed. In addition, there needs space to accommodate the anti-theft devices once they are unlocked, which brings unaesthetic appearance and inconvenience thanks to the limited internal space of automobiles. The electronic anti-theft devices are of various types and functions, but still have some problems. For example, the feeling of the owner of the automobile would be significantly affected by false alarms in a negative manner, so are the people around the area where the automobile is located. The electronic anti-theft devices consume power even in the standby mode, which puts a large burden on the onboard storage cell. Furthermore, the wireless electric signals of the anti-theft devices could be screened with a specific tool or intercepted and captured in the air by some thief, so that the automobiles would be stolen.

Therefore, it is becoming the common demand and object of the manufacturers and users of automobile safety devices, to ensure safety of the automobiles and reduce the negative impact of false alarms on the owners and people around the automobiles.

SUMMARY OF THE INVENTION

One object of the present invention is to provide a device for automobile safety which makes the automobile safer so as to address the aforementioned problems.

In order to achieve such an object, the present invention provides a device for automobile safety, comprising an RF antenna (JP1), an RFID module, a GSM unit, a data processing unit (U1), a control unit (U2) and automobile circuit, wherein, (i) the RF antenna (JP1) provides power to the RFID module in a wireless manner, and meanwhile receives an analog signal from the RFID module, and transmits the received analog signal to the data processing unit (U1) through a voltage drop circuit;

(ii) the data processing unit (U1) is connected with the control unit (U2) via a communication circuit, after receiving the analog signal input from the RF antenna (JP1), the data processing unit (U1) is subject to filtration and converts the analog signal into a digital serial signal to be transmitted to the control unit (U2) via the communication circuit, and the control unit (U2) controls the status of the data processing unit (U1) through the communication circuit;

(iii) the control unit (U2) is connected with a first relay (RL1) and a second relay (RL2) respectively through a first drive circuit and a second drive circuit, after receiving the digital serial signal sent by the digital processing unit (U1), the control unit (U2) obtains the identity information by a decoding process and then compares said identity information with the identity information pre-stored in the control unit (U2), if said two are identical, the identity shall be regarded as legal, the control unit (U2) controls the first relay (RL1) to be closed via the first drive circuit; if said two are different, the identity shall be regarded as illegal, and the control unit (U2) controls the first relay (RL1) to be opened via the first drive circuit;

(iv) the GSM unit is adapted to process a GSM signal, the GSM unit exchanges data with the control unit (U2) in a serial communication mode; the user sends an anti-theft state activation or release instruction, in the form of a short message, to the GSM unit through a service center, after receiving the instruction, the GSM unit transmits in the serial communication mode the instruction to the control unit (U2) for resolving the instruction received, if it is an anti-theft state activation instruction, then the control unit (U2) controls the second relay (RL2) to be opened through the second drive circuit; if it is an anti-theft state release instruction, the control unit (U2) controls the second relay (RL2) to be closed through the second drive circuit; and (v) the automobile circuits are connected in series with the relays (RL1, RL2), and the automobile could only be normally started when both relays are closed.

According to said device for automobile safety, the voltage drop circuit includes a first resistor (R1), a capacitor (C1) and a second capacitor (C2), in which two ends of the first resistor (R1) are connected with the RF antenna (JP1) and the data processing unit (U1) respectively, one end of the first capacitor (C1) is connected with the RF antenna (JP1), one end of the second capacitor (C2) is grounded, and the other end of the first capacitor (C1) and the other end of the second capacitor (C2) are linked to be connected with the data processing unit (U1).

According to said device for automobile safety, the data processing unit (U) is a programmable logic device (CPLD) or a field programmable gate array (FPGA).

According to said device for automobile safety, the control unit (U2) is a MSC-51 single chip microcomputer.

According to said device for automobile safety, the communication circuit includes a second resistor (R2) and a third resistor (R3), the data processing unit (U1) is connected with the first leg of the MSC-51 single chip microcomputer through the second resistor (R2) for controlling the state of the data processing unit (U1); after receiving the analog signal input by the RF antenna (JP1), the data processing unit (U1) is subject to filtration and converts the analog signal into the digital serial signal to be transmitted to the second leg of the MSC-51 single chip microcomputer via the third resistor (R3); and in the meantime, the data processing unit (U1) outputs a synchronous clock signal to the third leg of the MSC-51 single chip microcomputer, so as to aid the MSC-51 single chip microcomputer to accurately demodulate the digital serial signal.

In said device for automobile safety, the first drive circuit includes a first diode (D1), a fourth resistor (R4) and a third capacitor (C3), in which the anode of the first diode (D1) is connected with the fourth leg of the MSC-51 single chip microcomputer, one end of the fourth resistor (R4) is connected with the cathode of the first diode (D1), one end of the third capacitor (C3) is grounded, and the other end of the fourth resistor (R4) and the other end of the third capacitor (C3) are linked to be connected with the first relay (RL1).

After receiving the digital serial signal sent by the digital processing unit (U1), the MSC-51 single chip microcomputer is subject to a decoding process to obtain the identity information and then compares the identity information with the identity information pre-stored. If said two are identical, the identity shall be regarded as legal, the fourth leg of the MSC-51 single chip microcomputer outputs a high level and charges the third capacitor (C3) via the first diode (D1) and the fourth resistor (R4) to maintain the anode of the third capacitor (C3) at a certain voltage, and the first relay (RL1) is closed. If said two are different, the identity shall be regarded as illegal, the fourth leg of the MSC-51 single chip microcomputer is kept at a low level, and the first relay (RL1) is opened.

In said device for automobile safety, the second drive circuit includes a second diode (D2), a fifth resistor (R5) and a fourth capacitor (C4), in which the anode of the second diode (D2) is connected with the sixth leg of the MSC-51 single chip microcomputer, one end of the fifth resistor (R5) is connected with the cathode of the second diode (D2), one end of the fourth capacitor (C4) is grounded, and the other end of the fifth resistor (R5) and the other end of the fourth capacitor (C4) are linked to be connected with the second relay (RL2).

The user transmits an anti-theft state activation or release instruction, in the form of a short message, to the GSM unit through the service center. After receiving the instruction, the GSM unit transmits in the serial communication mode the instruction to the MSC-51 single chip microcomputer for resolving the instruction received. If it is an anti-theft state activation instruction, then the sixth leg of the MSC-51 single chip microcomputer is kept at a low level, and the second relay (RL2) is opened. If it is an anti-theft state release instruction, the sixth leg of the MSC-51 single chip microcomputer outputs a high level and charges the fourth capacitor (C4) via the second diode (D2) and the fifth resistor (R5) to maintain the anode of the fourth capacitor (C4) at a certain voltage, and the second relay (RL2) is closed.

In said device for automobile safety, the device for automobile safety further includes a GPS unit which is connected with the control unit (U2). The GPS unit is adapted to process a received GPS signal. A range setting instruction is transmitted by the user, in the form a short message, to the GSM unit through the service center. After receiving the instruction, the GSM unit transfers the instruction to the control unit (U2) in the serial communication mode. The control unit (U2) resolves the instruction received. If it is the range setting instruction, then the distance range in the range setting instruction is saved. The information of current position of the automobile could be obtained from the GPS unit and saved, and in the meantime the timer is activated. The information of current position of the automobile could be periodically read from the GPS unit and then compared with the position information as saved. If the distance difference exceeds the predetermined distance range, the fourth leg of the control unit (U2) is kept at a low level and the first relay (RL1) is opened. The GSM unit transmits a warning signal to the user through the service center, and the information of current position of the automobile obtained from the GPS unit is carried in the warning signal.

After the automobile is parked, the user could send a range setting instruction to set the safe distance of the automobile. When the automobile moves out of the safe distance, the warning signal is immediately transmitted to the user. Therefore, the user could understand in time the information of the automobile being stolen and the current position of the automobile, which would aid the user to get the automobile back in any way. This function is principally designed for the situation in which the automobile has to be directly and compulsively moved with trailers as the automobile could not be normally activated, and performed in connection with the anti-theft mode in which the automobile could only be activated only when both relays are closed, thereby making the automobile safer.

In said device for automobile safety, the device for automobile safety further includes a speech warning circuit which is connected with the control unit (U2). A speed setting instruction is transmitted by the user, in the form a short message, to the GSM unit through the service center. After receiving the instruction, the GSM unit transfers the instruction to the control unit (U2) in the serial communication mode. The control unit (U2) resolves the instruction received. If it is the maximum travelling speed setting instruction, then the maximum travelling speed in the maximum travelling speed setting instruction would be converted into a value of the distance travelled in each second and thus saved, and in the meantime the timer could be activated. The information of current position of the automobile is read once from the GPS unit every second, and the distance difference of the information of positions between two neighboring reading times is calculated. While the distance difference exceeds the predetermined value of the distance travelled in each second, the control unit (U2) controls the speech warning circuit to inform the driver that the automobiles is travelling beyond the speed limit.

In said device for automobile safety, the device for automobile safety further includes a timing unit which is connected with the control unit (U2). A fatigued driving period setting instruction is transmitted by the user, in the form a short message, to the GSM unit through the service center. After receiving the instruction, the GSM unit transfers the instruction to the control unit (U2) in the serial communication mode. The control unit (U2) resolves the instruction received. If it is the fatigued driving period setting instruction, then the timing unit is configured as per the value of fatigued driving period in the fatigued driving period setting instruction. While the continuous driving period exceeds the determined value of fatigued driving period, the control unit (U2) controls the speech warning circuit to inform the driver not to drive at fatigue.

In said device for automobile safety, the device for automobile safety further includes a speed measuring unit which is connected with the control unit (U2). A speed setting instruction is transmitted by the user, in the form a short message, to the GSM unit through the service center. After receiving the instruction, the GSM unit transfers the instruction to the control unit (U2) in the serial communication mode. The control unit (U2) resolves the instruction received. If it is the maximum travelling speed setting instruction, then the maximum travelling speed value in the maximum travelling speed setting instruction is saved, and in the meantime the timer is activated. The value of current speed of the automobile is periodically read once from the speed measuring unit. While the speed of the automobile exceeds the determined maximum travelling speed for 16 continuous seconds, the control unit (U2) controls the speech warning circuit to inform the driver that the automobile is travelling beyond the speed limit.

In said device for automobile safety, the first relay (RL1) and second relay (RL2) are relays of the same nature, including a relay body and a safety means. The relay body includes a weak current system, a strong current system, a base and a housing. The weak current system has an iron core, a coiling, a yoke, an armature and an armature compression spring. The safety means includes two fuse sockets and a fuse mounted between the two fuse sockets. One of the fuse sockets has a connector at the upper part and has a secure piece at the lower part. The secure piece is fixed on the yoke. The other one of the fuse sockets has a connector at the upper part and is provided with a power source pin and a secure leg at the lower part. An insulation spacer is located between the connector and the yoke. The power source pin passes through the base and is restricted to the base. The secure leg is inserted into the base. A fuse mounting port is provided at the top of the housing corresponding to these two fuse sockets, and the fuse is placed into the mounting port.

Compared with the prior art, in the device for automobile safety of the invention, two relays would only be closed when the identity information is legal and the user sends an anti-theft state release instruction in the form of a short message, and thus the automobile would be normally started. In other words, if the identity information is illegal or the user does not send any anti-theft state release instruction, the automobile would not be normally started. As such, the automobile is made safer. The device for automobile safety further provides functions to issue a warning when the automobile is travelling beyond the speed limit and/or the driver is driving at fatigue, which effectively prevents the driver driving the automobile at fatigue or beyond the speed limit. The relays employed in the device for automobile safety could be commonly used and conveniently mounted and replaced. The relays have an aesthetic appearance and occupy a small space.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The technical solutions of the invention will be further described in combination with embodiments of the invention with reference to the accompanying figures. However, the present invention will not be limited to these embodiments.

First Embodiment

Figure 1:
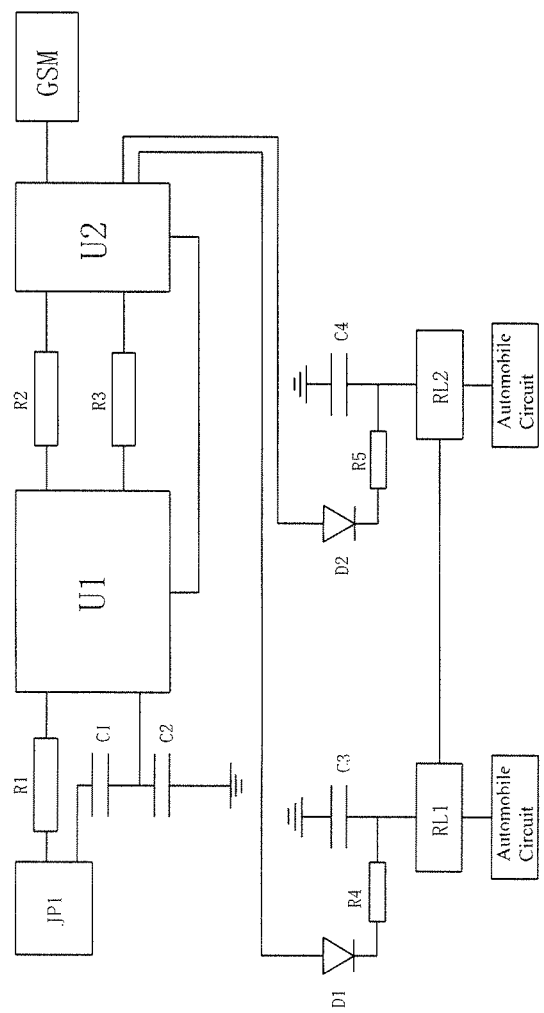
FIG. 1 is a systematic structural block diagram of a system of the device according to the first embodiment of the invention.

As shown in FIG. 1, the device for automobile safety of the invention includes a radio frequency (RF) antenna (W1), a radio frequency identification (RFID) module, a GSM unit, a data processing unit U1, a control unit U2 and automobile circuits, in which the data processing unit U1 is a programmable logic device CPLD or a field programmable gate array FPGA, the data processing unit U1 of the embodiment is a programmable logic device CPLD, and the control unit U2 is a MSC-51 single chip microcomputer. The device for automobile safety could be described in detail as follows:

A. The RF antenna JP 1 provides power to the RFID module in a wireless manner, and meanwhile receives an analog signal from the RFID module, and transmits the received analog signal to the data processing unit U1 through division of voltage via a first resistor R1, a first capacitor C1 and a second capacitor C2;

B. The data processing unit U1 is connected with the first leg of the control unit U2 via the resistor R2 for controlling the status of the data processing unit U1; after receiving the analog signal input the from RF antenna JP1, the data processing unit U1 is subject to filtration and converts the analog signal into a digital serial signal through a comparator set in the chip to be transmitted to the second leg of the control unit U2 via the resistor R3; and in the meantime, the data processing unit U1 outputs a synchronous clock signal to the third leg of the control unit U2, so as to aid the control unit U2 to accurately demodulate the digital serial signal;

C. The fourth leg of the control unit U2 is connected with a relay RL1 through a circuit composed of a diode D1, a resistor R4 and a capacitor C3, and the sixth leg of the control unit U2 is connected with a relay RL2 through a circuit composed of a diode D2, a resistor R5 and a capacitor C4; after receiving the digital serial signal sent by the digital processing unit U1, the control unit U2 obtains the identity information by decoding process and then compares said identity information with the identity information pre-stored in the control unit U2, if said two are identical, the identity shall be regarded as legal, the fourth leg of the control unit U2 outputs a high level, charges the capacitor C3 via D1 and R4 to keep the anode of the capacitor C3 at a certain voltage and the relay RL1 is closed; if said two are different, the identity shall be regarded as illegal, the fourth leg of the control unit U2 is maintained at low high level, and the relay RL1 is opened, the GSM unit sends a warning signal to a user through a service center, and the diodes D1 and D2 are both IN4148;

D. The GSM unit is adapted to process a GSM signal, the GSM unit is connected with the fifth leg of the control unit U2, and the GSM unit exchanges data with the control unit U2 in a serial communication mode; the user sends an anti-theft state activation or release instruction, in the form of a short message, to the GSM unit through the service center, after receiving the instruction, the GSM unit transmits in the serial communication mode the instruction to the control unit U2 for resolving the instruction received, if it is an anti-theft state activation instruction, then the sixth leg of the control unit U2 would be kept at a low level and the relay RL2 is opened; if it is an anti-theft state release instruction, the sixth leg of the control unit U2 is maintained at a high level, the capacitor C4 is charged through the diode D2 and the resistor R5 to keep the anode of the capacitor C4 at a certain voltage, and the relay RL2 is closed;

E. the automobile circuits are connected in series with the relays RL1 and RL2, and the automobile could only be normally started when both relays are closed.

The relays RL1 and RL2 are normally open relays and connected in series in the automobile oil ways or the engine circuit power supply. After the defense state is entered into, P1.4 and P1.6 of the control unit U2 would maintain a low level output to retain the relay opened, in which case the oil ways and circuit power supply are opened. Therefore, the automobile is ensured not to get on fire or be driven. As the relays are normally opened, the automobile is still theft-proof even if the relays are powered off or removed, which thereby increases the safety.

Moreover, when the automobile is normally driven, even if the anti-theft status is released, the states of P1.4 and P1.6 of the control unit U2 could be changed to output a high level, the capacitors C3 and C4 are charged through the diode D1 and the resistor R4 as well as the diode D2 and the resistor R in such a way that the anodes of the capacitors C3 and C4 are maintained at a certain voltage, and the oil ways or circuit power supply of the automobile are recovered to the switch-on state. While the automobile is travelling, even though errors occur for a short period due to interference, the control unit U2 sends out the low level signal. As the voltages of the capacitors would not immediately vary, the relays could be kept closed, so that the automobile could be properly driven and short suspensions would not be encountered, which would increase the reliability of the device.

Figure 2:
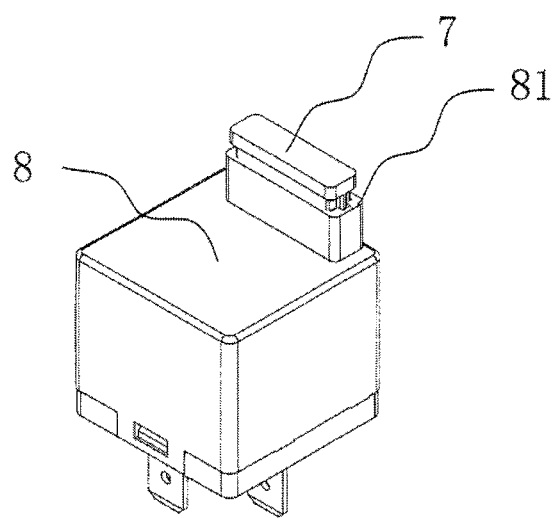
FIG. 2 is a stereogram of the relay employed in the invention.
Figure 3:
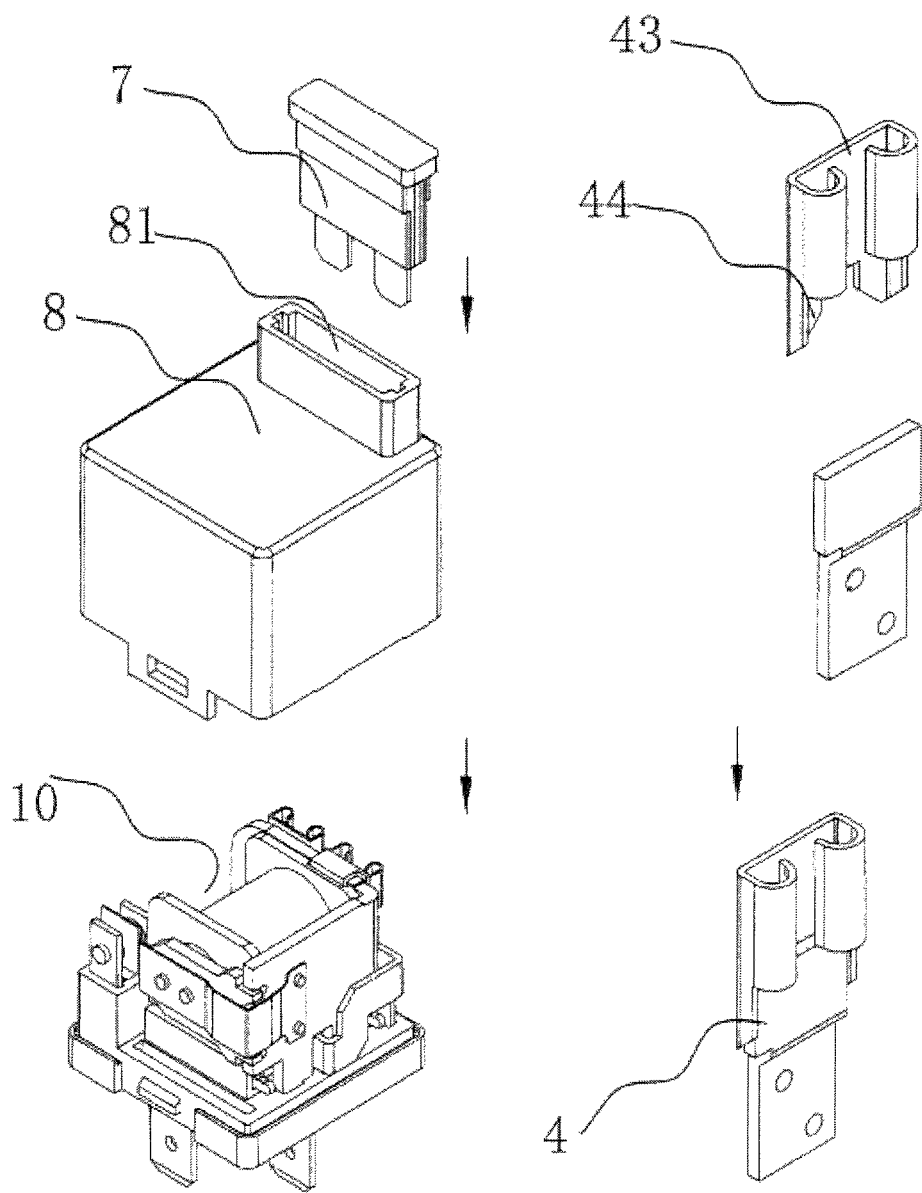
FIG. 3 is a structural explosive view of relay employed in the invention.

As shown in FIGS. 2 and 3, the relays RL1 and RL2 are implemented by the automobile relays having a safety means as disclosed in CN Patent No. 200810164226.X, including a relay body 10, a housing 8, a fuse socket 4 and a safety tube 7.

Similar to the conventional relays, the relay body 10 comprises a yoke, a coil assembly, an armature and a contact system, in which the iron core is riveted to the bottom circular hole of the yoke through the central circular hole of the coil shelf, and the yoke is inserted into a specific slot of the seat with the plugs at the bottom and thus fixed to the seat.

A fuse mounting port 81 is provided at the top of the housing 8 corresponding to the fuse socket 4. The fuse 7 is placed into the mounting port 81 and inserted into the standard sockets 43, 44. As such, a relay could be completely formed.

The relays employed in the invention could display the following advantages:

(a) The relays could be simply configured and commonly used by directly adding a safety means to the currently existing relays. As standard connectors are used at the upper part of two fuse sockets, the aesthetic appearance could be achieved and the filed of the products is improved, which further enhances the standardization of products, enhances production efficiency and saves the cost.

(b) The fuse could be mounted at the top of the housing, which facilitates mounting and replacement. The relays could maintain an aesthetic appearance of the original automobile relays and occupy a small space.

Second Embodiment

Figure 4:
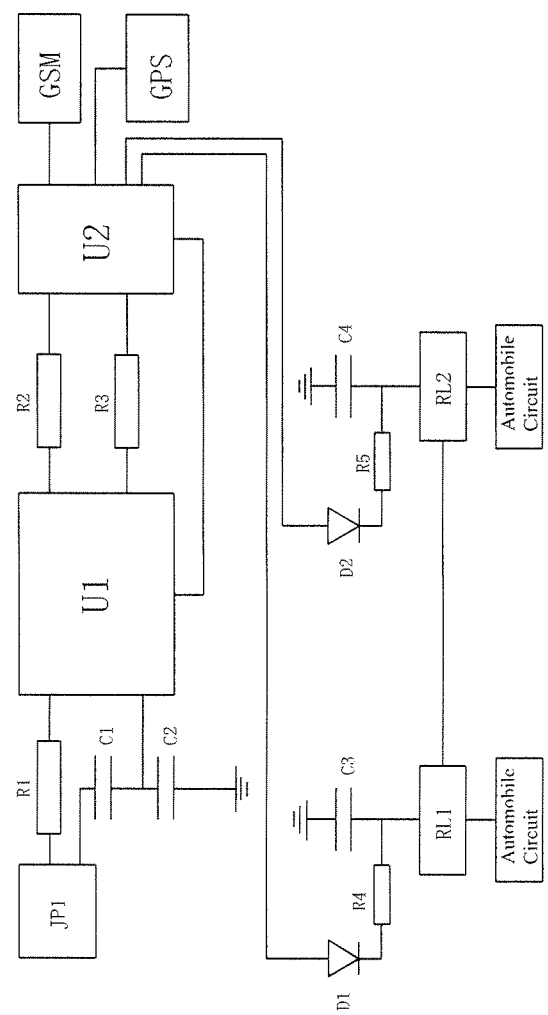
FIG. 4 is a systematic structural block diagram of the device according to the second embodiment of the invention.

With reference to FIG. 4, this embodiment is slightly different from the first embodiment in that the device for automobile safety of the invention further includes a GPS unit which is connected with the control unit U2. The GPS unit is adapted to process a received GPS signal. The user transmits a range setting instruction, in the form a short message, to the GSM unit through the service center. After receiving the instruction, the GSM unit transfers the instruction to the control unit U2 in the serial communication mode. The control unit U2 resolves the instruction received. If it is the range setting instruction, then the distance range in the range setting instruction would be saved, the information of current position of the automobile would be obtained from the GPS unit and saved, and in the meantime the timer is activated. The information of current position of the automobile would be periodically read from the GPS unit and then compared with, the position information as saved. If the distance difference exceeds the predetermined distance range, the fourth leg of the control unit U2 is kept at a low level and the relay RL1 is opened. The GSM unit transmits a warning signal to the user through the service center, in which the information of current position of the automobile obtained from the GPS unit is carried. The other structures and principles of this embodiment are the same as the first embodiment and will not described here for purpose of brevity.

Third Embodiment

Figure 5:
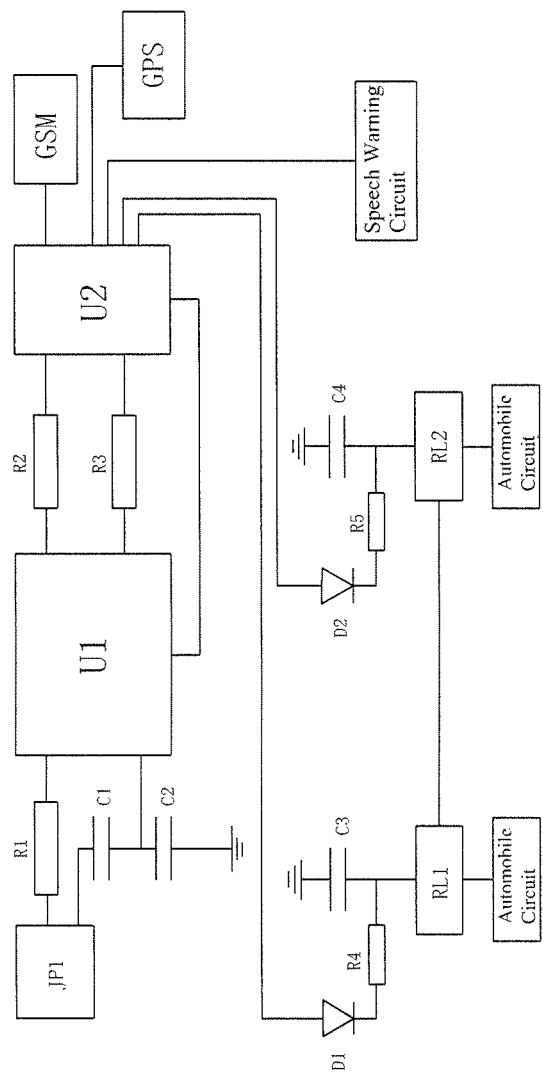
FIG. 5 is a systematic structural block diagram of the device according to the third embodiment of the invention.

Referring to FIG. 5, this embodiment is slightly different from the second embodiment in that the device for automobile safety of the invention is further provided with a speech warning circuit which is connected with the control unit U2. The user transmits a speed setting instruction, in the form a short message, to the GSM unit through the service center. After receiving the instruction, the GSM unit transfers the instruction to the control unit U2 in the serial communication mode. The control unit U2 resolves the instruction received. If it is the maximum travelling speed setting instruction, then the maximum travelling speed in the maximum travelling speed setting instruction would be converted into a value of the distance travelled in each second and thus saved, and in the meantime the timer is activated. The information of current position of the automobile is read once from the GPS unit every second, and the distance difference of the information of positions between two neighboring reading times is calculated. While the distance difference exceeds the predetermined value of the distance travelled in each second, the control unit U2 would control the speech warning circuit to inform the driver that the automobile is travelling beyond the speed limit. The other structures and principles of this embodiment are the same as the second embodiment and will not described here for purpose of brevity.

Fourth Embodiment

Figure 6:
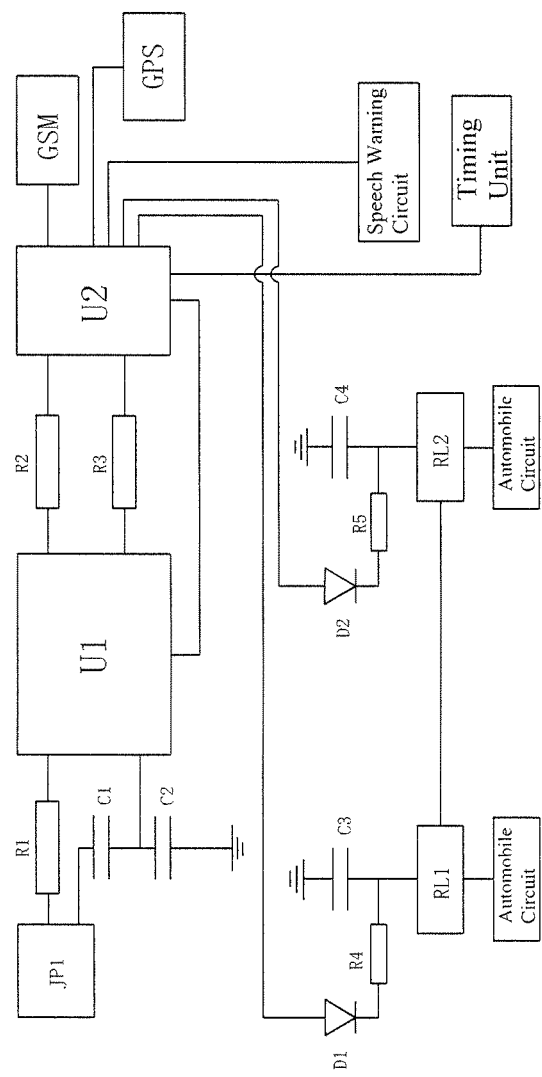
FIG. 6 is a systematic structural block diagram of the device according to the fourth embodiment of the invention.

As shown in FIG. 6, this embodiment is slightly different from the third embodiment in that the device for automobile safety of the invention is further provided with a timing unit which is connected with the control unit U2. The user transmits a fatigued driving period setting instruction, in the form a short message, to the GSM unit through the service center. After receiving the instruction, the GSM unit transfers the instruction to the control unit U2 in a serial communication mode. The control unit U2 resolves the instruction received. If it is the fatigued driving period setting instruction, then the timing unit is configured as per the value of fatigued driving period in the fatigued driving period setting instruction. While the continuous driving period exceeds the determined value of fatigued driving period, the control unit U2 would control the speech warning circuit to inform the driver not to drive at fatigue. The other structures and principles of this embodiment are the same as the third embodiment and will not described here for purpose of brevity.

Fifth Embodiment

Figure 7:
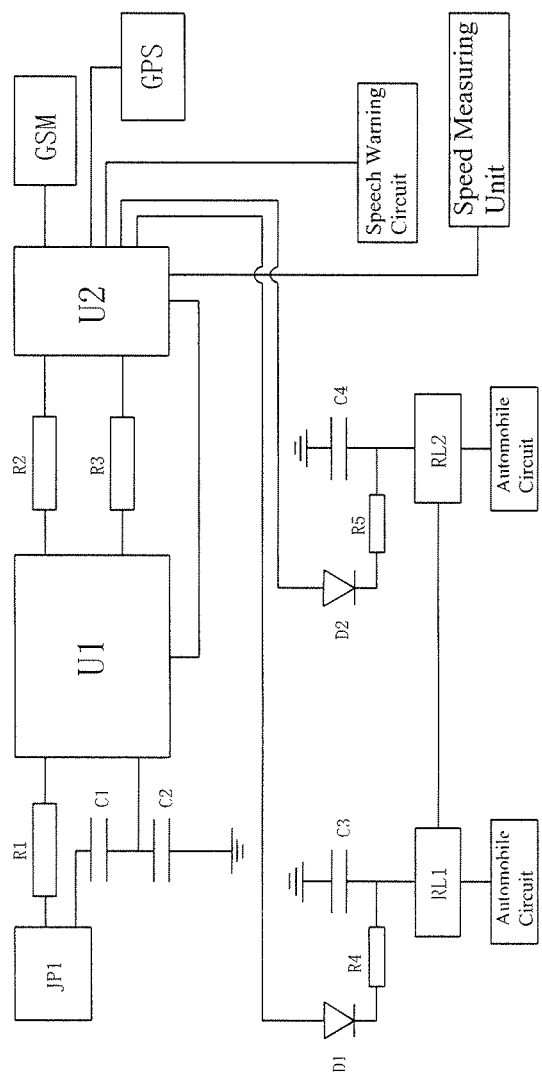
FIG. 7 is a systematic structural block diagram of the device according to the fifth embodiment of the invention.

With reference to FIG. 7, this embodiment is slightly different from the third embodiment in that the device for automobile safety of the invention is further provided with a speed measuring unit which is connected with the control unit U2. The user transmits a speed setting instruction, in the form a short message, to the GSM unit through the service center. After receiving the instruction, the GSM unit transfers the instruction to the control unit U2 in a serial communication mode. The control unit U2 resolves the instruction received. If it is the maximum travelling speed setting instruction, then the maximum travelling speed in the maximum travelling speed setting instruction is saved, and in the meantime the timer is activated. The value of current speed of the automobile is periodically read once from the speed measuring unit. While the speed of the automobile exceeds the determined maximum travelling speed for 16 continuous seconds, the control unit U2 would control the speech warning circuit to inform the driver that the automobile is travelling beyond the speed limit. The other structures and principles of this embodiment are the same as the third embodiment and will not described here for purpose of brevity.

The embodiments as described herein are merely illustrative, by examples, of the spirit of the present invention. Various amendments or supplementations or substitutions in similar ways, could be made to the embodiments thus described by those skilled in the art, without departing from the spirit of the invention or going beyond the scope of the invention as defined in the accompanying claims.

It is obvious that those skilled in the art should understand the functions of said control unit and data processing unit could be integrated into one single device or distributed over the system composed of several devices. The control unit and data processing unit could optionally be implemented by computer executable program codes in such a manner that they could be stored in a storage device to be executed by a computing device. Alternatively, the control unit and data processing unit could be implemented as various integrated circuit modules, or one single circuit module incorporating a number of blocks. In this connection, the prevent invention is not limited to a combination of any specific hardware or software.

What is claimed is:

1. A device for automobile safety, comprising an RF antenna (JP1), an RFID module, a GSM unit, a data processing unit (U1), a control unit (U2) and automobile circuits, wherein,
   (i) the RF antenna (JP1) provides power to the RFID module in a wireless manner, and meanwhile receives an analog signal from the RFID module, and transmits the received analog signal to the data processing unit (U1) through a voltage drop circuit;
   (ii) the data processing unit (U1) is connected with the control unit (U2) via a communication circuit, after receiving the analog signal input from the RF antenna (JP1), the data processing unit (U1) is subjected to filtration and converts the analog signal into a digital serial signal to be transmitted to the control unit (U2) via the communication circuit, and the control unit (U2) controls the status of the data processing unit (U1) through the communication circuit;
   (iii) the control unit (U2) is connected with a first relay (RL1) and a second relay (RL2) respectively through a first drive circuit and a second drive circuit, after receiving the digital serial signal sent by the digital processing unit (U1), the control unit (U2) obtains the identity information by a decoding process and then compares said identity information with the identity information pre-stored in the control unit (U2), if said two are identical, the identity shall be regarded as legal, the control unit (U2) controls the first relay (RL1) to be closed via the first drive circuit; if said two are different, the identity shall be regarded as illegal, and the control unit (U2) controls the first relay (RL1) to be opened via the first drive circuit;
   (iv) the GSM unit is adapted to process a GSM signal, the GSM unit exchanges data with the control unit (U2) in a serial communication mode; the user sends an anti-theft state activation or release instruction, in the form of a short message, to the GSM unit through a service center, after receiving the instruction, the GSM unit transmits in the serial communication mode the instruction to the control unit (U2) for resolving the instruction received, if it is an anti-theft state activation instruction, then the control unit (U2) controls the second relay (RL2) to be opened through the second drive circuit; if it is an anti-theft state release instruction, the control unit (U2) controls the second relay (RL2) to be closed through the second drive circuit; and
   (v) the automobile circuits are connected in series with the relays (RL1, RL2), and the automobile is only normally started when both relays are closed.

2. The device for automobile safety as claimed in claim 1, wherein, the voltage drop circuit includes a first resistor (R1), a capacitor (C1) and a second capacitor (C2), in which two ends of the first resistor (R1) is connected with the RF antenna (JP1) and the data processing unit (U1) respectively, one end of the first capacitor (C1) is connected with the RF antenna (JP1), one end of the second capacitor (C2) is grounded, and the other end of the first capacitor (C1) and the other end of the second capacitor (C2) is linked to be connected with the data processing unit (U1).

3. The device for automobile safety as claimed in claim 1, wherein, the data processing unit (U1) is a programmable logic device (CPLD) or a field programmable gate array (FPGA).

4. The device for automobile safety as claimed in claim 3, wherein, the control unit (U2) is a MSC-51 single chip microcomputer.

5. The device for automobile safety as claimed in claim 4, wherein, the communication circuit includes a second resistor (R2) and a third resistor (R3), the data processing unit (U1) is connected with the first leg of the MSC-51 single chip microcomputer through the second resistor (R2) for controlling the state of the data processing unit (U1); after receiving the analog signal input by the RF antenna (JP1), the data processing unit (U1) is subjected to filtration and converts the analog signal into the digital serial signal to be transmitted to the second leg of the MSC-51 single chip microcomputer via the third resistor (R3); and in the meantime, the data processing unit (U1) outputs a synchronous clock signal to the third leg of the MSC-51 single chip microcomputer, so as to aid the MSC-51 single chip microcomputer to accurately demodulate the digital serial signal.

6. The device for automobile safety as claimed in claim 4, wherein, the first drive circuit includes a first diode (D1), a fourth resistor (R4) and a third capacitor (C3), in which the anode of the first diode (D1) is connected with the fourth leg of the MSC-51 single chip microcomputer, one end of the fourth resistor (R4) is connected with the cathode of the first diode (D1), one end of the third capacitor (C3) is grounded, and the other end of the fourth resistor (R4) and the other end of the third capacitor (C3) is linked to be connected with the first relay (RL1).

7. The device for automobile safety as claimed in claim 5, wherein, the first drive circuit includes a first diode (D1), a fourth resistor (R4) and a third capacitor (C3), in which the anode of the first diode (D1) is connected with the fourth leg of the MSC-51 single chip microcomputer, one end of the fourth resistor (R4) is connected with the cathode of the first diode (D1), one end of the third capacitor (C3) is grounded, and the other end of the fourth resistor (R4) and the other end of the third capacitor (C3) is linked to be connected with the first relay (RL1).

8. The device for automobile safety as claimed in claim 6, wherein, the second drive circuit includes a second diode (D2), a fifth resistor (R5) and a fourth capacitor (C4), in which the anode of the second diode (D2) is connected with the sixth leg of the MSC-51 single chip microcomputer, one end of the fifth resistor (R5) is connected with the cathode of the second diode (D2), one end of the fourth capacitor (C4) is grounded, and the other end of the fifth resistor (R5) and the other end of the fourth capacitor (C4) is linked to be connected with the second relay (RL2).

9. The device for automobile safety as claimed in claim 7, wherein, the second drive circuit includes a second diode (D2), a fifth resistor (R5) and a fourth capacitor (C4), in which the anode of the second diode (D2) is connected with the sixth leg of the MSC-51 single chip microcomputer, one end of the fifth resistor (R5) is connected with the cathode of the second diode (D2), one end of the fourth capacitor (C4) is grounded, and the other end of the fifth resistor (R5) and the other end of the fourth capacitor (C4) is linked to be connected with the second relay (RL2).

10. The device for automobile safety as claimed in claim 4, wherein, said device for automobile safety further includes a GPS unit which is connected with the control unit (U2), the GPS unit is adapted to process a received GPS signal, a range setting instruction is transmitted by the user, in the form of a short message, to the GSM unit through the service center, after receiving the instruction, the GSM unit transfers the instruction to the control unit (U2) in the serial communication mode, the control unit (U2) resolves the instruction received, if it is the range setting instruction, then the distance range in the range setting instruction is saved, the information of current position of the automobile is obtained from the GPS unit and saved, and in the meantime the timer is activated, the information of current position of the automobile is periodically read from the GPS unit and then compared with the position information as saved, if the distance difference exceeds the predetermined distance range, the fourth leg of the control unit (U2) is kept at a low level and the first relay (RL1) is opened, the GSM unit transmits a warning signal to the user through the service center, and the information of current position of the automobile obtained from the GPS unit is carried in the warning signal.

11. The device for automobile safety as claimed in claim 8, wherein, said device for automobile safety further includes a GPS unit which is connected with the control unit (U2), the GPS unit is adapted to process a received GPS signal, a range setting instruction is transmitted by the user, in the form of a short message, to the GSM unit through the service center, after receiving the instruction, the GSM unit transfers the instruction to the control unit (U2) in the serial communication mode, the control unit (U2) resolves the instruction received, if it is the range setting instruction, then the distance range in the range setting instruction is saved, the information of current position of the automobile is obtained from the GPS unit and saved, and in the meantime the timer is activated, the information of current position of the automobile is periodically read from the GPS unit and then compared with the position information as saved, if the distance difference exceeds the predetermined distance range, the fourth leg of the control unit (U2) is kept at a low level and the first relay (RL1) is opened, the GSM unit transmits a warning signal to the user through the service center, and the information of current position of the automobile obtained from the GPS unit is carried in the warning signal.

12. The device for automobile safety as claimed in claim 9, wherein, said device for automobile safety further includes a GPS unit which is connected with the control unit (U2), the GPS unit is adapted to process a received GPS signal, a range setting instruction is transmitted by the user, in the form of a short message, to the GSM unit through the service center, after receiving the instruction, the GSM unit transfers the instruction to the control unit (U2) in the serial communication mode, the control unit (U2) resolves the instruction received, if it is the range setting instruction, then the distance range in the range setting instruction is saved, the information of current position of the automobile is obtained from the GPS unit and saved, and in the meantime the timer is activated, the information of current position of the automobile is periodically read front the GPS unit and then compared with the position information as saved, if the distance difference exceeds the predetermined distance range, the fourth leg of the control unit (U2) is kept at a low level and the first relay (RL1) is opened, the GSM unit transmits a warning signal to the user through the service center, and the information of current position of the automobile obtained from the GPS unit is carried in the warning signal.

13. The device for automobile safety as claimed in claim 10, wherein, said device for automobile safety further includes a speech warning circuit which is connected with the control unit (U2), a speed setting instruction is transmitted by the user, in the form of a short message, to the GSM unit through the service center, after receiving the instruction, the GSM unit transfers the instruction to the control unit (U2) in the serial communication mode, the control unit (U2) resolves the instruction received, if it is the maximum travelling speed setting instruction, then the maximum travelling speed in the maximum travelling speed setting instruction is converted into a value of the distance travelled in each second and thus saved, and in the meantime the timer is activated, the information of current position of the automobile is read once from the GPS unit every second, and the distance difference of the information of positions between two neighboring reading times is calculated, while the distance difference exceeds the predetermined value of the distance travelled in each second, the control unit (U2) controls the speech warning circuit to inform the driver that the automobiles is travelling beyond the speed limit.

14. The device for automobile safety as claimed in claim 11, wherein, said device for automobile safety further includes a speech warning circuit which is connected with the control unit (U2), a speed setting instruction is transmitted by the user, in the form of a short message, to the GSM unit through the service center, after receiving the instruction, the GSM unit transfers the instruction to the control unit (U2) in the serial communication mode, the control unit (U2) resolves the instruction received, if it is the maximum travelling speed setting instruction, then the maximum travelling speed in the maximum travelling speed setting instruction is converted into a value of the distance travelled in each second and thus saved, and in the meantime the timer is activated, the information of current position of the automobile is read once from the GPS unit every second, and the distance difference of the information of positions between two neighboring reading times is calculated, while the distance difference exceeds the predetermined value of the distance travelled in each second, the control, unit (U2) controls the speech warning circuit to inform the driver that the automobiles is travelling beyond the speed limit.

15. The device for automobile safety as claimed in claim 12, wherein, said device for automobile safety further includes a speech warning circuit which is connected with the control unit (U2), a speed setting instruction is transmitted by the user, in the form of a short message, to the GSM unit through the service center, after receiving the instruction, the GSM unit transfers the instruction to the control unit (U2) in the serial communication mode, the control unit (U2) resolves the instruction received, if it is the maximum travelling speed setting instruction, then the maximum travelling speed in the maximum travelling speed setting instruction is converted into a value of the distance travelled in each second and thus saved, and in the meantime the timer is activated, the information of current position of the automobile is read once from the GPS unit every second, and the distance difference of the information of positions between two neighboring reading times is calculated, while the distance difference exceeds the predetermined value of the distance travelled in each second, the control unit (U2) controls the speech warning circuit to inform the driver that the automobiles is travelling beyond the speed limit.

16. The device for automobile safety as claimed in claim 13, wherein, said device for automobile safety further includes a timing unit which is connected with the control unit (U2), a fatigued driving period setting instruction is transmitted by the user, in the form of a short message, to the GSM unit through the service center, after receiving the instruction, the GSM unit transfers the instruction to the control unit (U2) in the serial communication mode, the control unit (U2) resolves the instruction received, if it is the fatigued driving period setting instruction, then the timing unit is configured as per the value of fatigued driving period in the fatigued driving period setting instruction, while the continuous driving period exceeds the determined value of fatigued driving period, the control unit (U2) controls the speech warning circuit to inform the driver not to drive at fatigue.

17. The device for automobile safety as claimed in claim 14, wherein, said device for automobile safety further includes a timing unit which is connected with the control unit (U2), a fatigued driving period setting instruction is transmitted by the user, in the form of a short message, to the GSM unit through the service center, after receiving the instruction, the GSM unit transfers the instruction to the control unit (U2) in the serial communication mode, the control unit (U2) resolves the instruction received, if it is the fatigued driving period setting instruction, then the timing unit is configured as per the value of fatigued driving period in the fatigued driving period setting instruction, while the continuous driving period exceeds the determined value of fatigued driving period, the control unit (U2) controls the speech warning circuit to inform the driver not to drive at fatigue.

18. The device for automobile safety as claimed in claim 13, wherein, said device for automobile safety further includes a speed measuring unit which is connected with the control unit (U2), a speed setting instruction is transmitted by the user, in the form of a short message, to the GSM unit through the service center, after receiving the instruction, the GSM unit transfers the instruction to the control unit (U2) in the serial communication mode, the control unit (U2) resolves the instruction received, if it is the maximum travelling speed setting instruction, then the maximum travelling speed value in the maximum travelling speed setting instruction is saved, and in the meantime the timer is activated, the value of current speed of the automobile is periodically read once from the speed measuring unit, while the speed of the automobile exceeds the determined maximum travelling speed for 16 continuous seconds, the control unit (U2) controls the speech warning circuit to inform the driver that the automobile is travelling beyond the speed limit.

19. The device for automobile safety as claimed in claim 14, wherein, said device for automobile safety further includes a speed measuring unit which is connected with the control unit (U2), a speed setting instruction is transmitted by the user, in the form of a short message, to the GSM unit through the service center, after receiving the instruction, the GSM unit transfers the instruction to the control unit (U2) in the serial communication mode, the control unit (U2) resolves the instruction received, if it is the maximum travelling speed setting instruction, then the maximum travelling speed value in the maximum travelling speed setting instruction is saved, and in the meantime the timer is activated, the value of current speed of the automobile is periodically read once from the speed measuring unit, while the speed of the automobile exceeds the determined maximum travelling speed for 16 continuous seconds, the control unit (U2) controls the speech warning circuit to inform the driver that the automobile is travelling beyond the speed limit.

20. The device for automobile safety as claimed in claim 1, wherein, the first relay (RL1) and second relay (RL2) are relays of the same nature, including a relay body and a safety means, the relay body includes a weak current system, a strong current system, a base and a housing, the weak current system has an iron core, a coiling, a yoke, an armature and an armature compression spring, wherein the safety means includes two fuse sockets and a fuse mounted between the two fuse sockets, one of the fuse sockets has a connector at the upper part and has a secure piece at the lower part, the secure piece is fixed on the yoke, the other one of the fuse sockets has a connector at the upper part and is provided with a power source pin and a secure leg at the lower part, an insulation spacer is located between the connector and the yoke, the power source pin passes through the base and is restricted to the base, the secure leg is inserted into the base, a fuse mounting port is provided at the top of the housing corresponding to said two fuse sockets, and the fuse is placed into the mounting port.

* * * * *